United States Patent [19]
Hobson

[11] Patent Number: 5,705,293
[45] Date of Patent: Jan. 6, 1998

[54] SOLID STATE THIN FILM BATTERY HAVING A HIGH TEMPERATURE LITHIUM ALLOY ANODE

[75] Inventor: David O. Hobson, Oak Ridge, Tenn.

[73] Assignee: Lockheed Martin Energy Research Corporation, Oak Ridge, Tenn.

[21] Appl. No.: 780,999

[22] Filed: Jan. 9, 1997

[51] Int. Cl.$^6$ .................................................... H01M 10/39
[52] U.S. Cl. ........................... 429/162; 429/191; 429/218
[58] Field of Search ................................. 429/162, 124, 429/218, 191

[56] References Cited

U.S. PATENT DOCUMENTS

| 5,017,442 | 5/1991 | Watanabe et al. | 429/94 |
|---|---|---|---|
| 5,153,080 | 10/1992 | Inubishi et al. | 429/192 |
| 5,314,765 | 5/1994 | Bates | 429/194 |
| 5,338,625 | 8/1994 | Bates et al. | 429/193 |
| 5,401,593 | 3/1995 | Jones et al. | 492/103 |
| 5,437,942 | 8/1995 | Murata et al. | 429/192 |
| 5,445,906 | 8/1995 | Hobson et al. | 429/162 |
| 5,455,126 | 10/1995 | Bates et al. | 429/127 |
| 5,498,495 | 3/1996 | Tadaka et al. | 429/219 |
| 5,512,147 | 4/1996 | Bates et al. | 204/192.15 |
| 5,561,004 | 10/1996 | Bates et al. | 429/162 |
| 5,567,210 | 10/1996 | Bates et al. | 29/623.5 |
| 5,569,520 | 10/1996 | Bates | 429/162 |

*Primary Examiner*—John S. Maples
*Attorney, Agent, or Firm*—Joseph A. Marasco

[57] ABSTRACT

An improved rechargeable thin-film lithium battery involves the provision of a higher melting temperature lithium anode. Lithium is alloyed with a suitable solute element to elevate the melting point of the anode to withstand moderately elevated temperatures.

4 Claims, 2 Drawing Sheets

SOLID STATE THIN FILM BATTERY HAVING A HIGH TEMPERATURE LITHIUM ALLOY ANODE

The United States Government has rights in this invention pursuant to contract no. DE-AC05-96OR22464 between the United States Department of Energy and Lockheed Martin Energy Research Corporation.

CROSS-REFERENCE TO RELATED APPLICATIONS

The subject matter disclosed herein is related to following co-pending U.S. patent applications, each of which has been commonly assigned, and each of which is incorporated herein by reference:

1. U.S. patent application Ser. No. 08/248,929 filed May 25, 1994, now U.S. Pat. No. 5,597,660, entitled, "An Electrolyte for an Electrochemical Cell".
2. U.S. patent application Ser. No. 08/248,940 filed Jun. 29, 1994, now abandoned, entitled, "Thin Film Battery and Method for Making Same".
3. U.S. patent application Ser. No. 08/248,941 filed Jul. 1, 1994, entitled, "A cathode for an Electrochemical Cell".
4. U.S. patent application Ser. No. 08/601,740 filed Feb. 15, 1996, entitled, "Lithium Ion-Conducting Ceramic Coating for Organic Separator Membranes and Electrolyte Membranes used in Lithium Batteries and Associated Method".
5. U.S. patent application Ser. No. 08/634,115 filed Apr. 17, 1996, now U.S. Pat. No. 5,612,152, entitled, "Rechargeable Lithium Battery for Use in Applications Requiring a Low to High Power Output".

FIELD OF THE INVENTION

The present invention relates to solid state batteries having a lithium or lithium alloy anode, and more particularly to such batteries having anodes.

BACKGROUND OF THE INVENTION

A successful thin-film, solid state, rechargeable lithium battery has been under development at Oak Ridge National Laboratory. Please refer to the following U.S. patents issued to John B. Bates, et al., each of which has been commonly assigned, and each of which is incorporated herein by reference:

U.S. Pat. No. 5,561,004 describes a thin film battery including components which are capable of reacting upon exposure to air and water vapor. The battery incorporates a packaging system which provides a barrier against the penetration of air and water vapor. The packaging system includes a protective sheath overlying and coating the battery components and can be comprised of an overlayer including metal, ceramic, a ceramic-metal combination, a parylene-metal combination, a parylene-ceramic combination or a parylene-metal-ceramic combination.

U.S. Pat. No. 5,569,520 describes rechargeable lithium batteries which employ characteristics of thin-film batteries which can be used to satisfy power requirements within a relatively broad range. Thin-film battery cells utilizing a film of anode material, a film of cathode material and an electrolyte of an amorphous lithium phosphorus oxynitride can be connected in series or parallel relationship for the purpose of withdrawing electrical power simultaneously from the cells. In addition, such battery cells which employ a lithium intercalation compound as the cathode material can be connected in a manner suitable for supplying power for the operation of an electric vehicle. Still further, by incorporating within the battery cell a relatively thick cathode of a lithium intercalation compound, a relatively thick anode of lithium and an electrolyte film of lithium phosphorus oxynitride, the battery cell is rendered capable of supplying power for any of a number of consumer products, such as a lap-top computer or a cellular telephone.

U.S. Pat. No. 5,455,126 describes a thin-film battery, especially a thin-film microbattery, and a method for making same having application as a backup or primary integrated power source for electronic devices. The battery includes a novel electrolyte which is electrochemically stable and does not react with the lithium anode and a novel vanadium oxide cathode. Configured as a microbattery, the battery can be fabricated directly onto a semiconductor chip, onto the semiconductor die or onto any portion of the chip carrier. The battery can be fabricated to any specified size or shape to meet the requirements of a particular application. The battery is fabricated of solid state materials and is capable of operation between −15° C. and 150° C.

U.S. Pat. Nos. 5,338,625, 5,512,147, and 5,567,210 describe aspects of a thin-film battery, especially a thin-film microbattery, and a method for making same having application as a backup or primary integrated power source for electronic devices. The battery includes a novel electrolyte which is electrochemically stable and does not react with the lithium anode, and a novel vanadium oxide cathode. Configured as a microbattery, the battery can be fabricated directly onto a semiconductor chip, onto the semiconductor die or onto any portion of the chip carrier. The battery can be fabricated to any specified size or shape to meet the requirements of a particular application. The battery is fabricated of solid state materials and is capable of operation between −15° C. and 150° C.

U.S. Pat. No. 5,314,765 describes a battery structure including a cathode, a lithium metal anode and an electrolyte disposed between the lithium anode and the cathode. The battery structure utilizes a thin-film layer of lithium phosphorus oxynitride overlying so as to coat the lithium anode and thereby separate the lithium anode from the electrolyte. If desired, a preliminary layer of lithium nitride may be coated upon the lithium anode before the lithium phosphorous oxynitride is, in turn, coated upon the lithium anode so that the separation of the anode and the electrolyte is further enhanced. By coating the lithium anode with this material lay-up, the life of the battery is lengthened and the performance of the battery is enhanced.

One of the problems inherent in a battery that uses metallic lithium as an anode is the low melting point (m.p.) of that material (180.6° C.). The typical thin-film lithium battery, because of its extreme thinness and low heat capacity, is susceptible to thermal degradation if the ambient temperature approaches the m.p. of the Li. It will immediately acquire the temperature of whatever substrate upon which it is deposited. The use of batteries described hereinabove is therefore limited to operating temperatures below the melting point of the lithium anode (180.6° C., nominally 180° C.).

OBJECTS OF THE INVENTION

Accordingly, objects of the present invention include the provision of new and improved thin-film lithium batteries which can be used in applications where the temperature is in the range of less than 180° C. to about 500° C.

Further and other objects of the present invention will become apparent from the description contained herein.

SUMMARY OF THE INVENTION

In accordance with one aspect of the present invention, the foregoing and other objects are achieved by a thin-film electrochemical cell suitable for use in temperatures exceeding 180° C. which includes:

a) a substrate;

b) a first and a second electrically conductive film deposited on the surface of the substrate, the first and second films separated horizontally and the first film larger than the second film;

c) a third film of cathode material deposited on the surface of the first film;

d) a fourth film of an electrolyte overlapping the third film to extend upon the first film and to partially extend upon the substrate separating the first and second films and at least partially upon the second film; and e) a fifth film comprising a lithium alloy having a melting point higher than the melting point of pure lithium deposited over substantially all of the second and the fourth films, the fifth film being electrochemically stable in contact with the fourth film.

Figure 1:
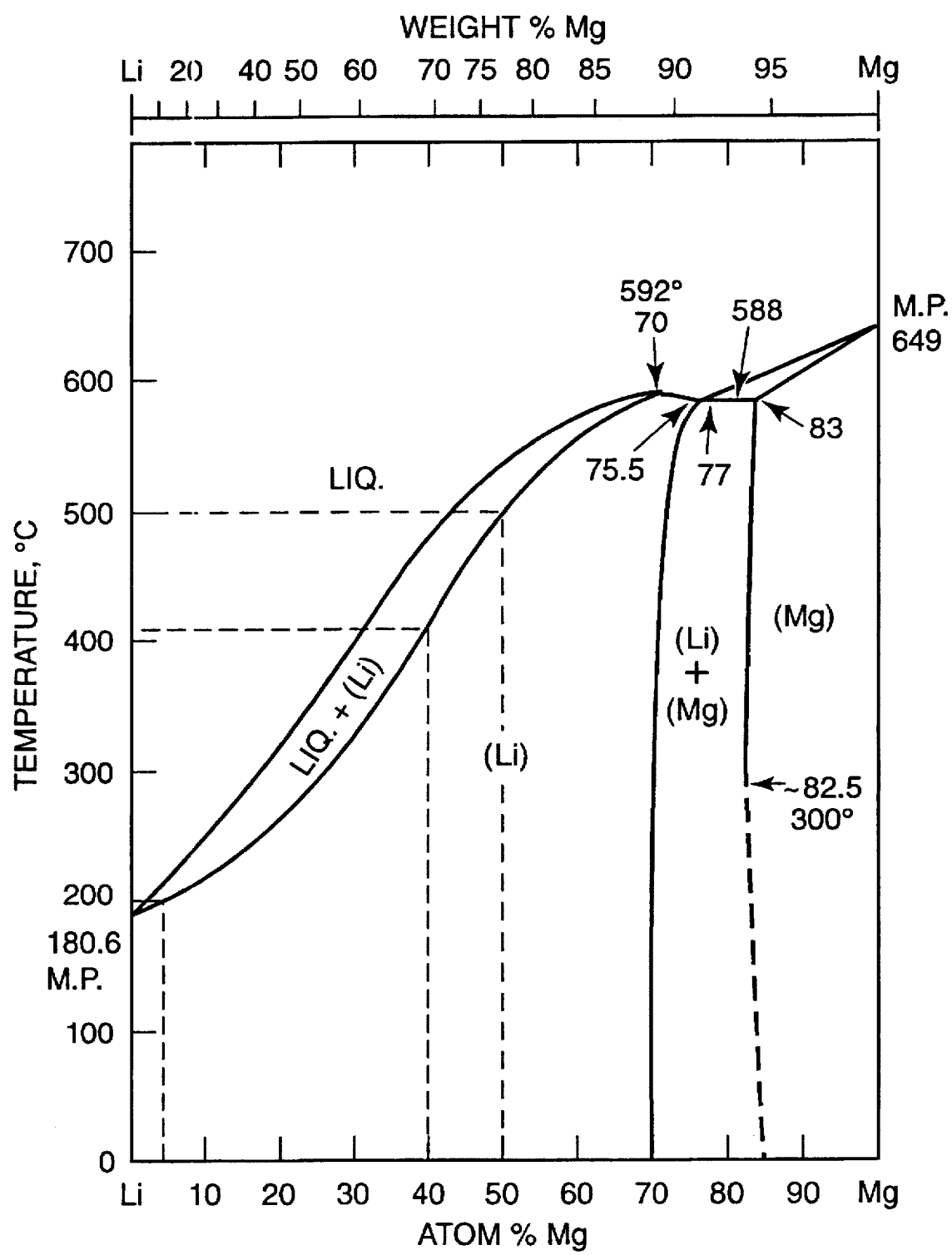
FIG. 1 is a modified graph from "The Handbook of Binary Phase Diagrams", W. G. Moffett, Genium Publishing Corporation, 1987 showing the melting points of Li/Mg alloys which are useful in carrying out the present invention.

For a better understanding of the present invention, together with other and further objects, advantages and capabilities thereof, reference is made to the following disclosure and appended claims in connection with the above-described drawings.

DETAILED DESCRIPTION OF THE INVENTION

Since the Li anode has the lowest melting point of the active components of a typical thin-film, solid state, rechargeable lithium battery, any increase in anode melting point translates directly into an increased operating temperature for the battery, particularly if the battery is deposited onto a glass or ceramic substrate. The melting point of lithium can be raised by combining it with a suitable second, solute metal to form a solid-solution alloy. Suitability of the solute metal is dependent on the following criteria:

1) The solute metal must combine with Li to form a Li-rich (at least 30% Li), solid solution alloy.

2) Such an alloy must exhibit rising solidus/liquidus lines.

3) Such solidus/liquidus lines should preferably rise steeply.

4) Li and the solute metal should have similar (or compatible) vapor pressures as a function of temperature.

For example, the Li-Mg alloy system meets the above described criteria as follows:

1) The system is a solid solution to approximately 70–75 atomic percent (a/o) Mg.

2) It has a two-phase (Li plus liquid) region over that composition range, with rising liquidus/solidus curves.

3) The slope of the solidus curve is steep; a 10 a/o Mg alloy has a m.p. 37 degrees above the m.p. of Li; a 30 a/o alloy—144 degrees above the m.p. of Li.

4) The vapor pressure curves, as a function of temperature, for the two elements are adjacent to each other, which will allow the alloy to be thermally evaporated onto the battery.

The electrical effect, on the battery, of a solute addition to the Li metal anode material is a reduction of the current carrying capacity of the battery. Therefore, the alloy is preferably optimized by the addition of minimum solute to achieve suitability for the highest operating temperature expected for a particular application of the present invention.

In accordance with the present invention, a solid-state, thin-film Li battery is constructed in the anode/electrolyte/cathode geometry as taught in the above referenced patents. The anode is Li preferably alloyed with up to 50 a/o Mg (to achieve a selected operating temperature of up to 500° C.); the electrolyte is a Li phosphorus oxynitride (LiPON); and the cathode is any one of a number of Li intercalation compounds, such as $\alpha V_2 O_5$. Up to 70 a/o Mg may be used in order to achieve a selected operating temperature of up to about 592° C., with requisite tradeoff in current capacity with lowered Li content. A more preferable range of Li/Mg alloys contain from about 5 a/o Mg to about 40 a/o Mg to achieve a selected operating temperature in the range of about 200° C. up to about 415° C.

A master alloy of the selected composition is melted and cast into an appropriate shape to form a source for a subsequent physical vapor deposition method (pvd) such as thermal evaporation, magnetron sputtering, etc. The alloy is deposited as a thin film through an appropriate mask.

Although magnesium is described as the preferred solute element, any element or combination of elements that meet the criteria stated herein are considered to be suitable for carrying out the present invention.

Figure 2:
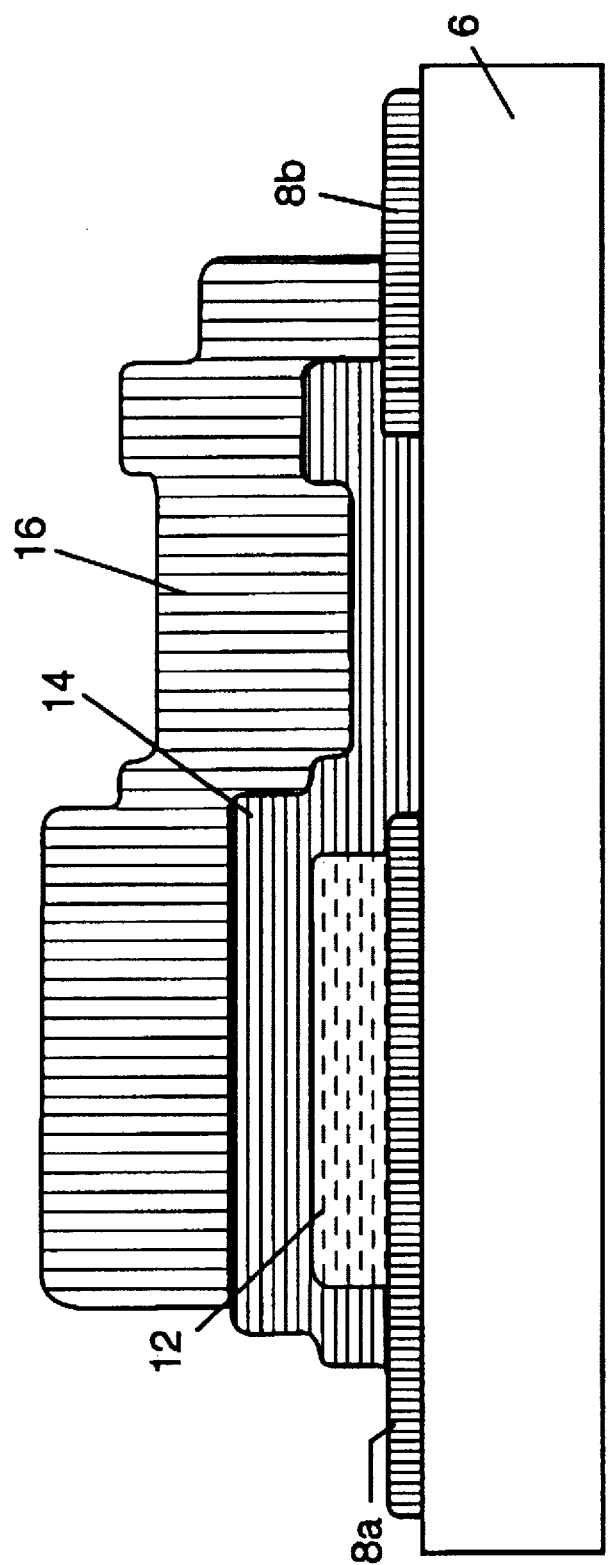
FIG. 2 schematically illustrates a cross-sectional view of a thin-film battery in accordance with the present invention.

Referring to FIG. 2, a general sequence of battery layer construction (each through an appropriate mask) is:

1) Deposition of V current collectors 8a, 8b onto a suitable substrate 6 by dc magnetron sputtering in Ar.

2) Deposition of a $\alpha V_2 O_5$ cathode 12 by reactive dc magnetron sputtering of vanadium in an Ar—$O_2$ mixture.

3) Deposition of a LIPON electrolyte 14 by reactive rf magnetron sputtering of a lithium ortho-phosphate target in an Ar—$N_2$ mixture.

4) Evaporation of the Li/Mg master alloy anode 16 in vacuum.

5) An optional step includes coating the battery with a protective film.

The thin-film battery is in itself unique in the rechargeable battery industry. The present invention will give it the additional advantage of a higher operating temperature. Moreover, higher fabrication temperatures are possible, including heat treatment of the battery to improve its electrical characteristics.

While there has been shown and described what are at present considered the preferred embodiments of the invention, it will be obvious to those skilled in the art that various changes and modifications can be made therein without departing from the scope of the inventions defined by the appended claims.

What is claimed is:

1. A thin-film electrochemical cell suitable for use at temperatures exceeding 180° C. comprising:

a) a substrate;

b) a first and a second electrically conductive film deposited on the surface of said substrate, said first and second films separated horizontally and said first film larger than said second film;

c) a third film of cathode material deposited on the surface of said first film;

d) a fourth film of an electrolyte overlapping said third film to extend upon said first film and to partially extend upon said substrate separating said first and second films and at least partially upon said second film; and e) a fifth film comprising a lithium alloy having a melting point higher than the melting point of pure lithium deposited over substantially all of said second and said fourth films, said fifth film being electrochemically stable in contact with said fourth film, said thin-film electrochemical cell being operable at temperatures exceeding about 180° C.

2. A thin-film electrochemical cell in accordance with claim 1 wherein said lithium alloy comprises at least 50 a/o lithium.

3. A thin-film electrochemical cell in accordance with claim 1 wherein said lithium alloy comprises lithium and magnesium.

4. A thin-film electrochemical cell in accordance with claim 3 wherein said lithium alloy comprises a selected amount of magnesium in the range of about 5 a/o to about 40 a/o, balance lithium.

* * * * *